(12) United States Patent
Zheng (10) Patent No.: US 9,442,753 B2
(45) Date of Patent: Sep. 13, 2016

(54) CREATING VIRTUAL MACHINES

(71) Applicant: Hangzhou H3C Technologies Co., Ltd., Hangzhou (CN)

(72) Inventor: Xiongkai Zheng, Beijing (CN)

(73) Assignee: HANGZHOU H3C TECHNOLOGIES CO., LTD., Hangzhou, Zhejiang (CN)

(*) Notice: Subject to any disclaimer, the term of this patent is extended or adjusted under 35 U.S.C. 154(b) by 0 days.

(21) Appl. No.: 14/652,763

(22) PCT Filed: Sep. 26, 2013

(86) PCT No.: PCT/CN2013/084270
§ 371 (c)(1),
(2) Date: Jun. 16, 2015

(87) PCT Pub. No.: WO2014/117533
PCT Pub. Date: Aug. 7, 2014

(65) Prior Publication Data
US 2015/0339148 A1    Nov. 26, 2015

(30) Foreign Application Priority Data
Jan. 31, 2013    (CN) .......................... 2013 1 0042901

(51) Int. Cl.
*G06F 9/455* (2006.01)
*G06F 11/14* (2006.01)
(Continued)

(52) U.S. Cl.
CPC ........... *G06F 9/45558* (2013.01); *G06F 9/445* (2013.01); *G06F 9/461* (2013.01); *G06F 11/14* (2013.01); *G06F 11/1451* (2013.01);
(Continued)

(58) Field of Classification Search
CPC ................. G06F 9/45558; G06F 2009/45562; G06F 2009/45575
USPC .............................................. 718/1; 707/640
See application file for complete search history.

(56) References Cited

U.S. PATENT DOCUMENTS 5,838,968 A * 11/1998 Culbert ................. G06F 9/5011
                                                                  718/103
8,060,703 B1    11/2011 Desai et al.
(Continued)

FOREIGN PATENT DOCUMENTS

CN    101072541    11/2007
CN    102214118    10/2011
(Continued)

OTHER PUBLICATIONS

Srirama et al., "Direct Migration of Scientific Computing Experiments to the Cloud", 2013.*
(Continued)

*Primary Examiner* — Phillip H Nguyen
(74) *Attorney, Agent, or Firm* — Hewlett Packard Enterprise Patent Department (57) ABSTRACT

A method to create virtual machines is provided. An initially empty primary copy-on-write (COW) image of a base disk image is created, and an initially empty secondary COW image of the primary COW image is created. A virtual machine is booted from the secondary COW image. Writes by the virtual machine are stored in the secondary COW image. When the secondary COW image reaches a capacity threshold, data of the secondary COW image is committed into the primary COW image and then the secondary COW is cleared of data.

15 Claims, 6 Drawing Sheets

(51) Int. Cl.
*G06F 9/445* (2006.01)
*G06F 9/46* (2006.01)

(52) U.S. Cl.
CPC ....... *G06F11/1458* (2013.01); *G06F 11/1464* (2013.01); *G06F 11/1461* (2013.01); *G06F 2009/45562* (2013.01); *G06F 2009/45575* (2013.01); *G06F 2009/45583* (2013.01); *G06F 2201/81* (2013.01); *G06F 2201/815* (2013.01)

(56) References Cited

U.S. PATENT DOCUMENTS

| | | | |
|---|---|---|---|
| 8,190,574 | B2 | 5/2012 | Barnes et al. |
| 8,407,301 | B1 | 3/2013 | Pendharkar |
| 2009/0300076 | A1* | 12/2009 | Friedman ............ G06F 11/3664 |
| 2010/0049929 | A1 | 2/2010 | Nagarkar et al. |
| 2010/0153617 | A1* | 6/2010 | Miroshnichenko ..... G06F 3/061 711/6 |
| 2010/0174943 | A1 | 7/2010 | Liu et al. |
| 2012/0117342 | A1 | 5/2012 | Karonde et al. |
| 2012/0221612 | A1* | 8/2012 | Zachariassen .... G06F 17/30067 707/827 |

FOREIGN PATENT DOCUMENTS

| | | |
|---|---|---|
| CN | 102521083 | 6/2012 |
| CN | 102821158 | 12/2012 |

OTHER PUBLICATIONS

International Search Report and Written Opinion dated Jan. 9, 2014 issued on PCT Patent Application No. PCT/CN2013/084270 dated Sep. 26, 2013, the State Intellectual Property Office, P.R. China.
Cavalli et al, "VMWare Snapshots", Sep. 22, 2008, pp. 8-17; http://phyweb.lbl.gov/atlaswiki/images/a/ac/VML-report-off-print.pdf.

* cited by examiner

CREATING VIRTUAL MACHINES

CLAIM FOR PRIORITY

The present application is a national stage filing under 35 U.S.C. §371 of PCT application number PCT/CN2013/084270, having an international filing date of Sep. 26, 2013, which claims priority to Chinese patent application number 201310042901.2, having a filing date of Jan. 31, 2013, the disclosures of which are hereby incorporated by reference in their entireties.

BACKGROUND

Virtualization is used to increase server hardware utilization and reduce costs in data centers. A hypervisor is virtualization software for creating virtual machines, which function like physical computers with operating systems and applications.

BRIEF DESCRIPTION OF THE DRAWINGS

In the drawings:

FIGS. 4-1, 4-2, 4-3, 4-4 are block diagrams illustrating the recovery of virtual machine disks for virtual machines in examples of the present disclosure.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on.

Using a hypervisor, a virtual machine boots from a disk image with an operating system (OS). Multiple virtual machines of the same configuration may be created by cloning a template disk image to obtain independent disk images, and then booting the virtual machines from the disk images.

The above described deployment of virtual machines may consume a large amount of storage space and operate inefficiently. If each disk image uses four (4) gigabyte (GB), then 1,000 virtual machines would use 4,000 GB. The template disk image is cloned again and again to create the independent disk images. Updating of the OS in the disk images or cloning the disk images are resource intensive due to the sheer number of the disk images.

One way to address the disadvantages this is to use the backing file technique. In the backing file technique, a read-only base disk image is created, and copy-on-write (COW) images of the base disk image are created. Each virtual machine is booted from an independent COW image, which only contains private data different from the base disk image. Writes by the virtual machine are stored in the COW image and reads by the virtual machine are first sought out in the COW image and then in the base disk image. Cloning or backing up the virtual machine involves copying the incremental data in the COW image as the data in the base disk image does not change.

Each time the OS in the base disk image is updated, a new COW image may be added to store the changes. In other words, a new level of COW image is added. However, without limiting the total number of levels, the number of COW images may become large (e.g., 10 or more) when there are many OS updates. The large number of levels may result in poor user experience as reads by the virtual machine is slowed by a search through the levels (e.g. 10 levels) of COW images for the requested data.

Figure 1:
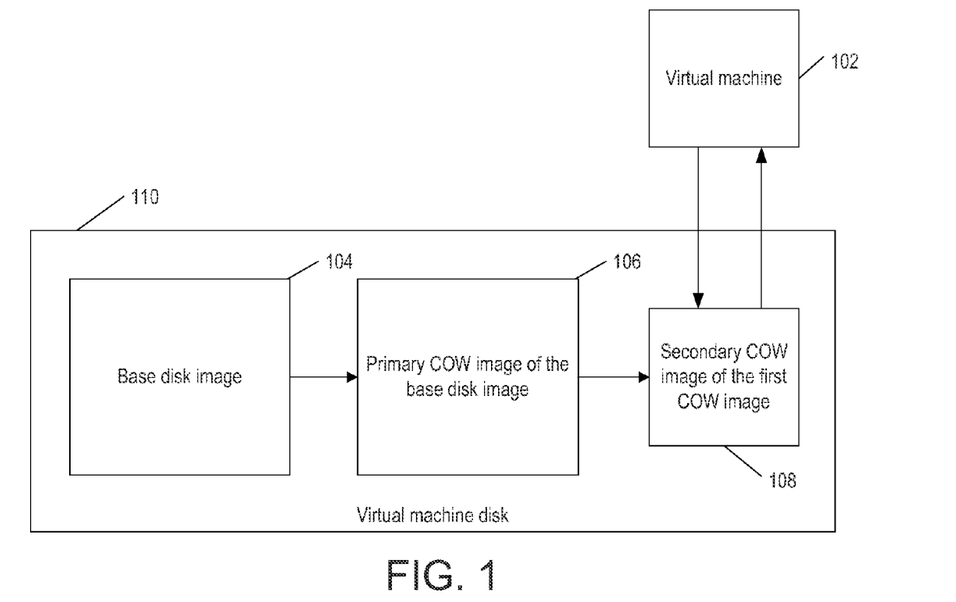
FIG. 1 is a block diagram illustrating the creation of virtual machines in examples of the present disclosure.

FIG. 1 is a block diagram illustrating the creation of virtual machines, such as a virtual machine 102, in examples of the present disclosure. A base disk image 104 (also known as "base mirror image file") is first created or received. Base disk image 104 is a template used to create virtual machines of a particular configuration. Base disk image 104 may be stored in a shared storage for parallel access.

A primary COW image 106 (also known as "primary incremental mirror image file") of base disk image 104 is created. Primary COW image 106 may be initially empty. A secondary COW image 108 (also known as "secondary incremental mirror image file") of primary COW image 106 is created. Secondary COW image 108 may be initially empty. Virtual machine 102 with a guest operating system is booted from secondary COW image 108.

As virtual machine 102 is booted from secondary COW image 108, writes by virtual machine 102 are stored in secondary COW image 108. In other words, secondary COW image 108 holds the private data of virtual machine 102. Reads by virtual machine 102 that are not found in secondary COW image 108 are retrieved from its parent, the primary COW image 106. Reads by virtual machine 102 that are not found in primary COW image 106 are retrieved from its parent, the base disk image 104. Thus base disk image 104, primary COW image 106, and secondary COW image 108 form a virtual machine disk 110 for virtual machine 102.

Figure 2:
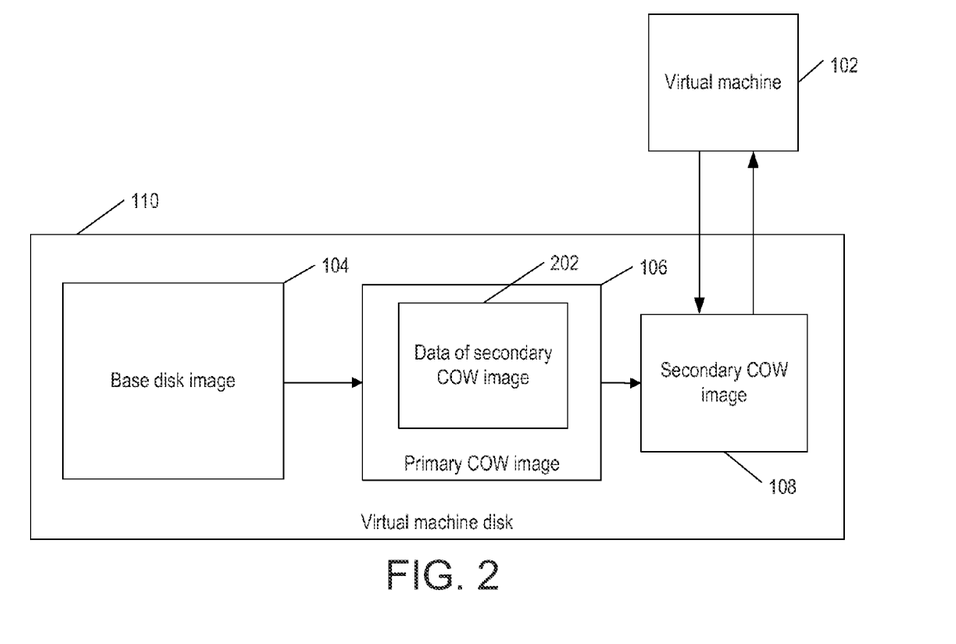
FIG. 2 is a block diagram illustrating the commitment of data from a secondary copy-on-write image into a primary copy-on-write image in examples of the present disclosure.

FIG. 2 is a block diagram illustrating the commitment of data from secondary COW image 108 into primary COW image 106 in examples of the present disclosure. Each time secondary COW image 108 reaches a capacity threshold or virtual machine 102 is to be backed up, data 202 from secondary COW image 108 is committed into primary COW image 106. In other words, data from secondary COW image 108 is saved in primary COW image 106 and any new version of a datum overwrites an old version of the datum. Secondary COW image 108 may then be cleared of data. Before being cleared of data, secondary COW image 108 may be backed up. When secondary COW image 108 is backed up for the very first time, base disk image 104 may also be backed up so virtual machine disk 110 may be recovered. Instead of clearing secondary COW image 108, a new secondary COW image 108 may be created and the old secondary COW image 108 then becomes the backup.

Figure 3:
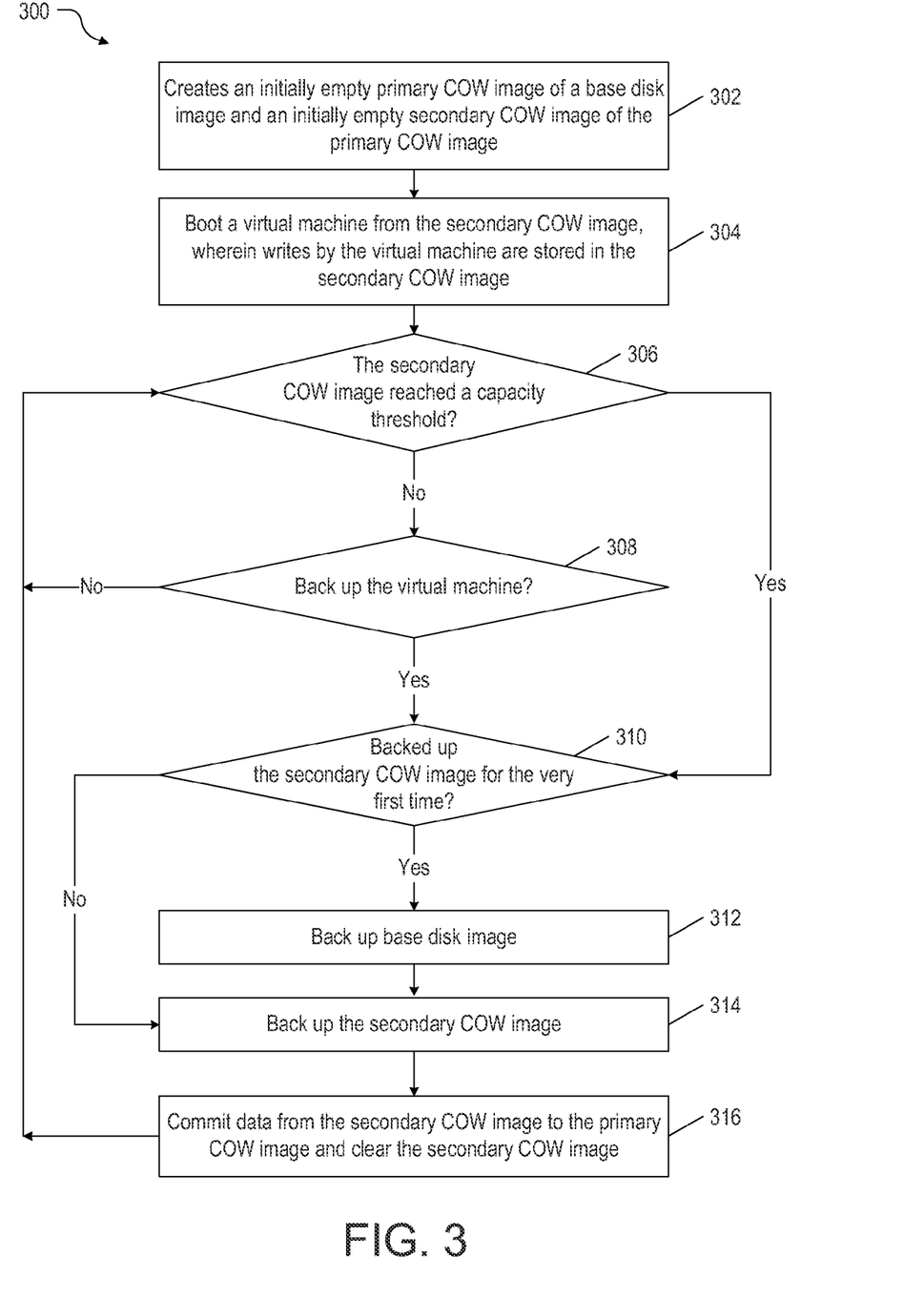
FIG. 3 is a flowchart of a method to create virtual machines in examples of the present disclosure.

FIG. 3 is a flowchart of a method 300 to create virtual machines (e.g., virtual machine 102 of FIGS. 1 and 2) in examples of the present disclosure. Method 300 may be implemented as software with a non-transitory, machine readable medium having instructions to be executed by a processor. The software may use a hypervisor running on a computer. Method 300 may begin in block 302.

In block 302, the processor creates an initially empty primary COW image 106 (FIGS. 1 and 2) based on base disk image 104 (FIGS. 1 and 2), and an initially empty secondary COW image 108 (FIGS. 1 and 2) based on primary COW image 106. In some examples of the present disclosure, base disk image 104, primary COW image 106, and secondary COW image 108 are created using the open source virtualizer QEMU and they follow the qcow2 format of QEMU. Block 302 may be followed by block 304.

In block 304, the processor boots virtual machine 102 from secondary COW image 108. As discussed before, writes by virtual machine 102 are stored in secondary COW image 108 and reads by virtual machine 102 may be retrieved from secondary COW image 108, primary COW image 106, or base disk image 104. Block 304 may be followed by block 306.

In block 306, the processor determines if secondary COW image 108 has reached a capacity threshold. The capacity threshold may be selected to allow fast incremental backup of virtual machine 102. If secondary COW image 108 has reached the capacity threshold, block 306 may be followed by block 310. Otherwise block 306 may be followed by block 308.

In block 308, the processor determines if virtual machine 102 is to be backed up. Virtual machine 102 may backed up periodically or based on the amount of access. If virtual machine 102 is to be backed up, block 308 may be followed by block 310. Otherwise method 300 may loop back to block 306.

In block 310, the processor may determine if this is the very first time secondary COW image 108 has been backed up. If so, block 310 may be followed by block 314. Otherwise block 310 may be followed by block 312.

In block 312, the processor may back up base disk image 104. For example, the processor saves a copy of base disk image 104 in another local hard disk, in a local computer, or in a remote computer. Block 312 may be followed by block 314.

In block 314, the processor may back up secondary COW image 108. For example, the processor saves a copy of secondary COW image 108 in another local hard disk, in a local computer, or in a remote computer. Before saving a copy of secondary COW image 108, the processor may stop or suspend virtual machine 102 when virtual machine 102 is operating so virtual machine 102 may reach a consistent state. Block 314 may be followed by block 316.

In block 316, the processor commits data 202 (FIG. 2) from secondary COW image 108 into primary COW image 106 and then clears secondary COW image 108. This may be implemented through Libvirt or another virtualization application protocol interface (API) to manage virtualization technologies including QEMU, Linux KVM, Xen, and VMware ESX. For example, a virsh blockcommit domain command may be added to commit data from secondary COW image 108 into primary COW image 106 when virtual machine 102 is operating or stopped. When virtual machine 102 is operating, Libvirt sends a commit all command to QEMU. When virtual machine 102 is stopped, Libvirt calls a qemu-img commit command for primary COW image 106 and secondary COW image 108. Method 300 may loop back to block 306.

FIGS. 4-1, 4-2, 4-3, 4-4 are block diagrams illustrating the recovery of virtual machine disks of virtual machines (e.g., virtual machine disk 110 of virtual machine 102 in FIGS. 1 and 2) in examples of the present disclosure. Virtual machine disk 110 is to be recovered when one or more of base disk image 104 (FIGS. 1 and 2), primary COW image 106 (FIGS. 1 and 2), and secondary COW image 108 (FIGS. 1 and 2) become corrupted. As discussed above, secondary COW image 108 may be backed up when it reaches a capacity threshold or when virtual machine 102 (FIGS. 1 and 2) is to be backed up. For example, as shown in FIG. 4-1, assume there are three backup copies 402, 404, and 406 of secondary COW image 108 stored in chronology order. Also shown FIG. 4-1 is a backup base disk image 104'.

A new primary COW image 106' of backup base disk image 104's is created, and data from backup copies 402, 404, and 406 of secondary COW image are committed into new primary COW image 106' in chronological order. Thus FIG. 4-1 shows the data from backup copy 402 of secondary COW image being committed into new primary COW image 106', FIG. 4-2 shows the data from backup copy 404 of secondary COW image being committed into new primary COW image 106', FIG. 4-3 shows the data from backup copy 406 secondary COW image being committed into new primary COW image 106', and FIG. 4-4 shows new primary COW image 106' with the data from backup copies 404, 404, and 406 of secondary COW image. Also shown in FIG. 4-4 is that a new secondary COW image 108' of new primary COW image 106' is created, and a new virtual machine 102' is booted from new secondary COW image 108', which is substantially the same as virtual machine 102 (FIG. 1).

Figure 5:
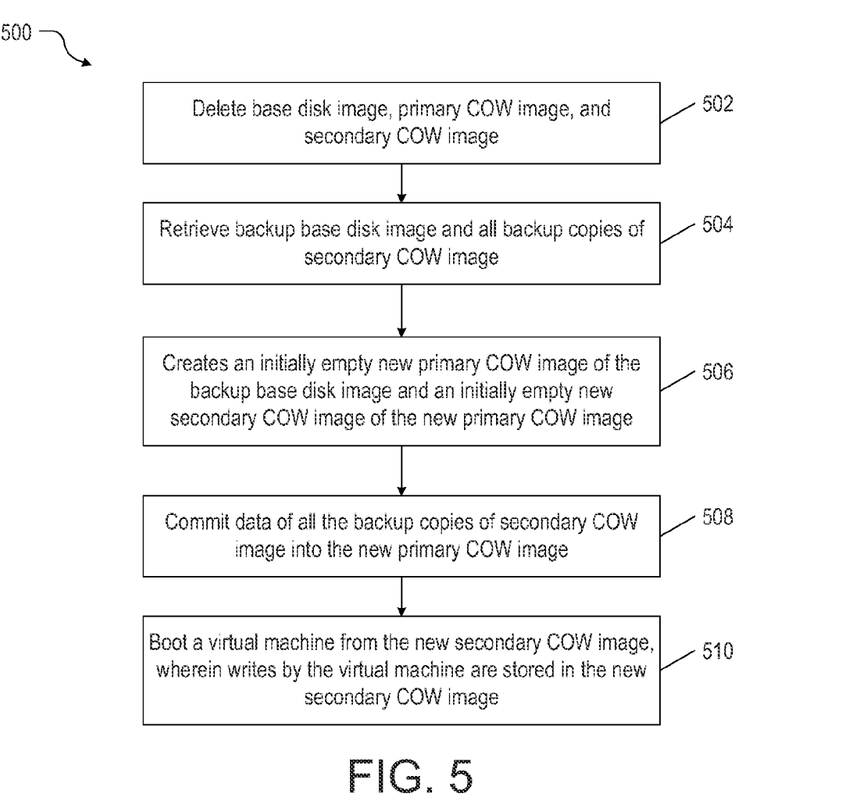
FIG. 5 is a flowchart of a method to recover virtual machines in examples of the present disclosure.

FIG. 5 is a flowchart of a method 500 to recover virtual machines (e.g., virtual machine 102 in FIGS. 1 and 2) in examples of the present disclosure. Method 500 may be implemented as software with machine readable instructions to be executed by a processor. The software may use a hypervisor running on a computer. Method 500 may begin in block 502.

In block 502, the processor may delete base disk image 104, primary COW image 106, and secondary COW image 108. Before base disk image 104, deleting primary COW image 106, and secondary COW image 108, the processor may shut down or turn off virtual machine 102 when virtual machine 102 is operating. Block 502 may be followed by block 504.

Figure 41:
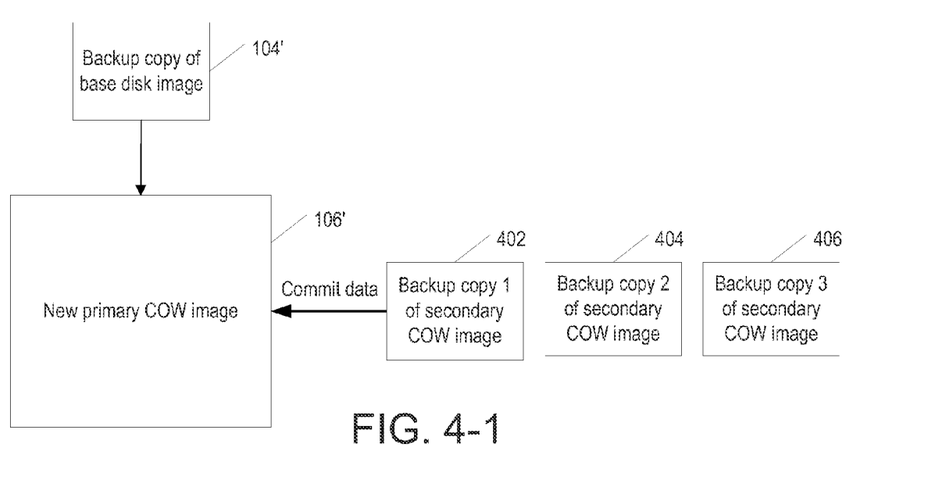
Figure 42:
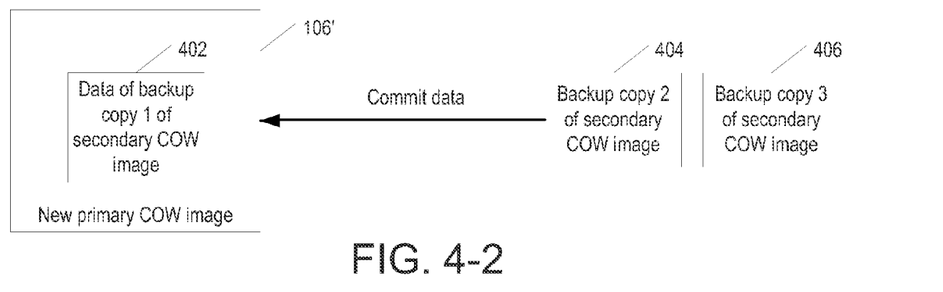
Figure 43:
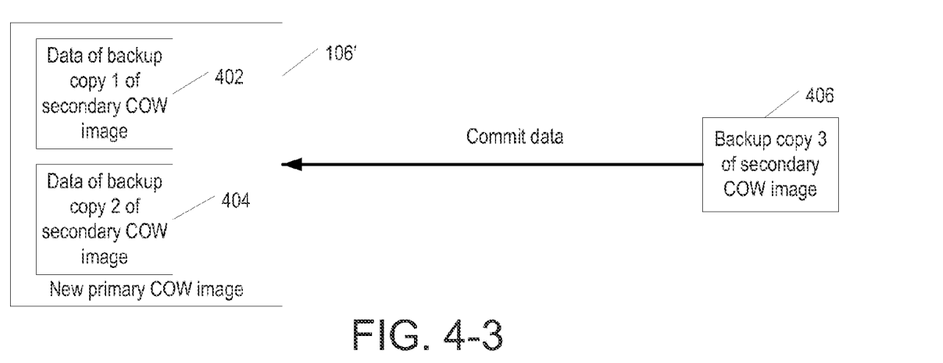

In block 504, the processor may retrieve copies of backup base disk image 104' and backup copies of secondary COW image 108 (e.g., backup copies 402, 404, and 406 in FIG. 4-1). Block 504 may be followed by block 506.

Figure 44:
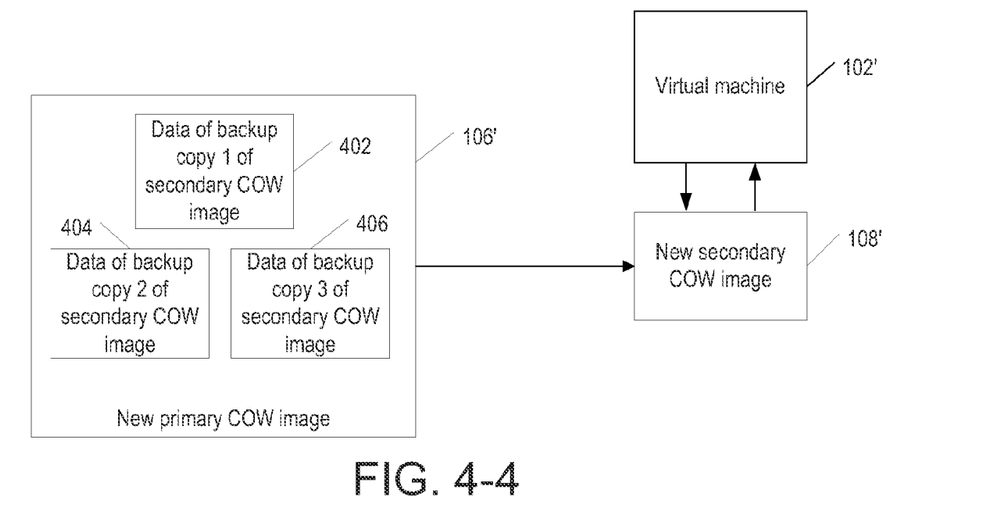

In block 506, the processor creates an initially empty new primary COW image 106' (FIG. 4-1) of backup base disk image 104' (FIG. 4-1), and an initially empty new secondary COW image 108' (FIG. 4-4) of new primary COW image 106'. Block 506 may be followed by block 508.

In block 508, the processor commits data from backup copies 402, 404, and 406 of secondary COW image 108 (FIGS. 1 and 2) into new primary COW image 106' in chronological order. The processor may delete backup copies 402, 404, and 406 of secondary COW image. Block 508 may be followed by block 510.

In block 510, the processor boots new virtual machine 102' (FIG. 4-4) from new secondary COW image 108'. As discussed before, writes by virtual machine 102 are stored in new secondary COW image 108' and reads by new virtual machine 102' may be retrieved from new secondary COW image 108', new primary COW image 106', or backup base disk image 104'. Data from new secondary COW image 108' may be backed up and committed to new primary COW image 106' as described with respect to method 300 in FIG. 3.

Figure 6:
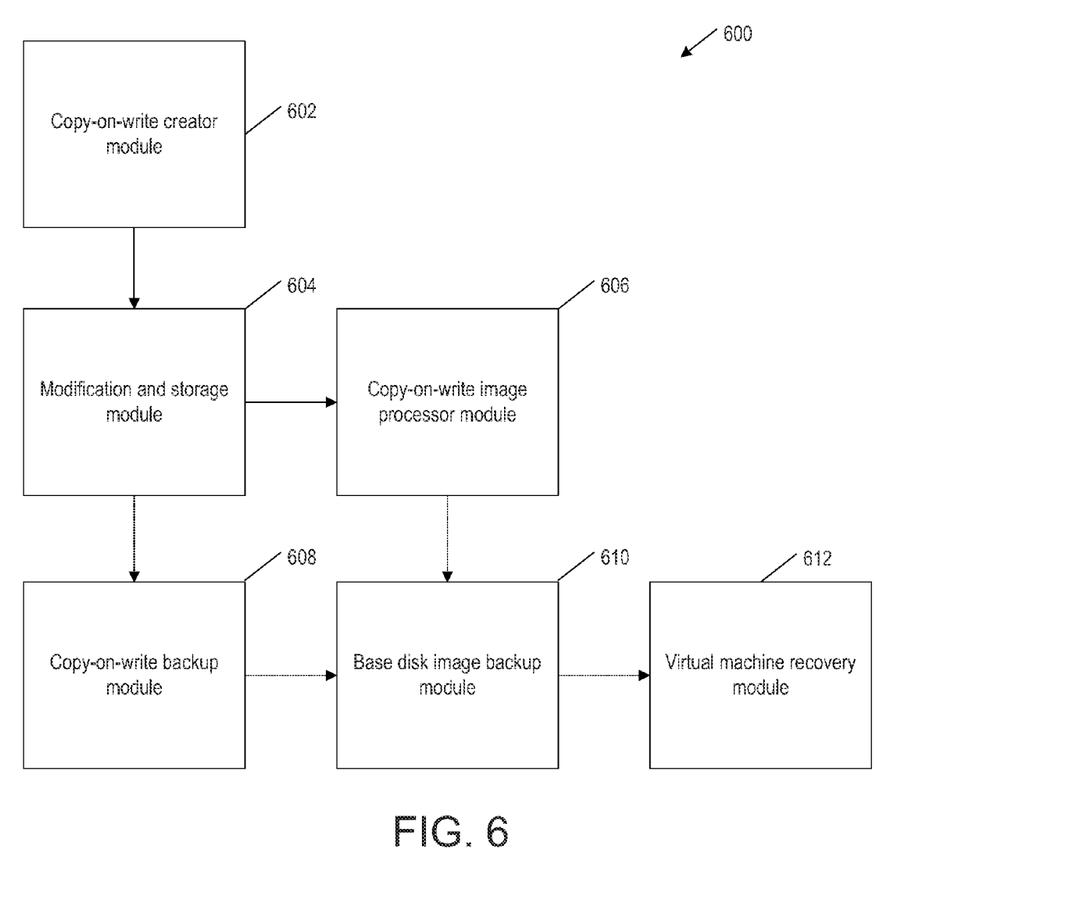
FIG. 6 shows an apparatus to create and recover virtual machines in examples of the present disclosure.
Figure 7:
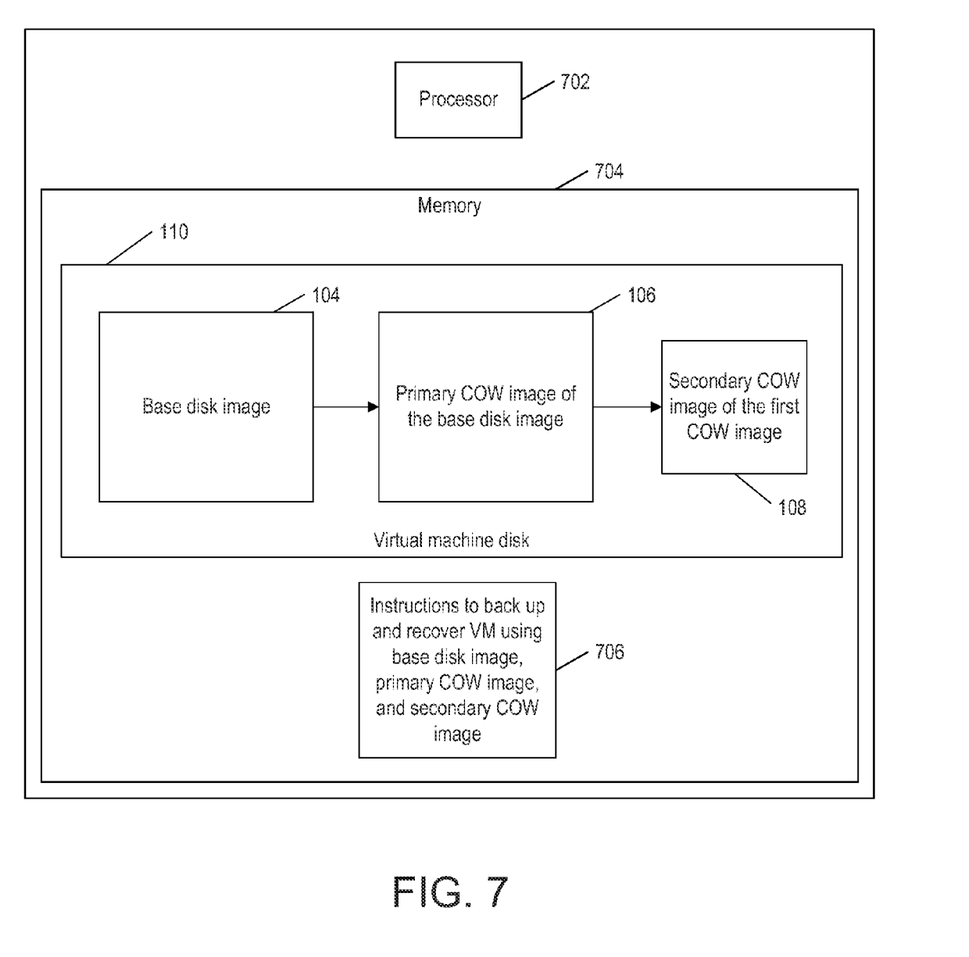
FIG. 7 shows the apparatus of FIG. 6 implemented with a processor and a nonvolatile memory in one or more examples of the present disclosure.

FIG. 6 shows an apparatus 600 to create and recover virtual machines (e.g., virtual machine 102 in FIGS. 1, 2, and 4-4) in examples of the present disclosure. Apparatus 600 includes modules, which may be implemented in software, hardware, or a combination of software and hardware, to implements methods 300 and 500 (FIGS. 3 and 5). FIG. 7 shows apparatus 600 implemented with a processor 702 and a nonvolatile memory 704 in one or more examples of the present disclosure. Nonvolatile memory 704 includes virtual machine 110 and machine readable instructions that are executed by processor 702 to back up and restore a VM using base disk image 104, primary COW image 106, and secondary COW image 108.

Referring back to FIG. 6, a copy-on-write creator module 602 is to create COW images, such as an initially empty primary COW image 106 (FIGS. 1 and 2) and an initially empty secondary COW image 108 (FIGS. 1 and 2).

A modification and storage module 604 is to store writes 202 by virtual machine 102 (FIG. 2) to secondary COW image 108.

A COW image processor module 606 is to commit data from secondary COW image 108 to primary COW images 106, and clear secondary COW image 108.

Apparatus 600 may include a COW backup module 608 is to back up secondary COW image 108 when it has reached a capacity threshold or when virtual machine 102 is to be backed up.

Apparatus 600 may include a base disk image backup module 610 is to back up a base disk image 104 (FIGS. 1, 2, and 4-1) when secondary COW image 108 is backed up for the very first time.

Apparatus 600 may include a virtual machine recovery module 612 is to recover virtual machine disk 110 (FIGS. 1 and 2) for virtual machine 102 by creating an initially empty new primary COW image 106' (FIGS. 4-1 to 4-4) of backup base disk image 104' (FIG. 4-1), creating an initially empty new secondary COW image 108' (FIG. 4-4) of new primary COW image 106', committing data from backup copies of secondary COW image 108 (e.g., backup copies 402, 404, and 406 in FIGS. 4-1 to 4-4) into new primary COW image 106', and boot a new virtual machine 102' from new secondary COW image 106'. Virtual machine recovery module 612 may also delete base disk image 104, primary COW image 106, and secondary COW image 108, and retrieve backup base disk image 104' and backup copies 402, 404, and 406 of secondary COW image 108.

In examples of the present disclosure, virtual machines of the same initial configuration may be deployed efficiently as one base disk image is shared by the virtual machines and two empty COW images are generated for each virtual machine. Read access by each virtual machine is fast as there are only two levels of COW images to search for data. Backing up each virtual machine is also fast as it is performed incrementally by backing up the secondary COW image when it reaches a capacity threshold and before committing the data from the secondary COW image into the primary COW image. Customer private data are better protected as each virtual machine only stores private data in its own COW images, which cannot be accessed by other virtual machines.

In examples of the present disclosure, fast cloning and offline migration of virtual machines are realized. As the base disk image may be stored in a shared storage that can be accessed by all physical hosts, cloning a virtual machine locally or remotely may be accomplished by cloning of the primary and the secondary COW images. Similarly, migrating a virtual machine to a destination host offline may be accomplished by migrating the primary and the secondary COW images.

Various other adaptations and combinations of features of the examples disclosed are within the scope of the invention.

What is claimed is:

1. A method to create virtual machines, comprising:
    creating an initially empty primary copy-on-write image of a base disk image, the base disk image being a template for the virtual machines;
    creating an initially empty secondary copy-on-write image of the primary copy-on-write image;
    booting a virtual machine from the secondary copy-on-write image;
    storing writes by the virtual machine writes in the secondary copy-on-write image; and
    when the secondary copy-on-write image reaches a capacity threshold, committing data from the secondary copy-on-write image into the primary copy-on-write image and clearing the secondary copy-on-write image.

2. The method of claim 1, further comprising backing up the data of the secondary copy-on-write image prior to clearing the secondary copy-on-write image.

3. The method of claim 2, further comprising, when backing up the data of the secondary copy-on-write image for the very first time, backing up the base disk image.

4. The method of claim 3, further comprising recovering the virtual machine by:
    retrieving the backup base disk image and all backup secondary copy-on-write images;
    creating an initially empty new primary copy-on-write image of the backup base disk image;
    committing data from all the backup secondary copy-on-write images into the new primary copy-on-write image;
    creating an initially empty new secondary copy-on-write image of the new primary copy-on-write image;
    booting a new virtual machine from the new secondary copy-on-write image; and
    storing writes by the new virtual machine writes in the new secondary copy-on-write image.

5. The method of claim 1, further comprising, when the virtual machine is to be backed up, backing up the data of the secondary copy-on-write image, committing the data from the secondary copy-on-write image into the primary copy-on-write image, and clearing the secondary copy-on-write image.

6. The method of claim 5, further comprising, when backing up the data of the secondary copy-on-write image for the very first time, backing up the base disk image.

7. The method of claim 6, further comprising recovering the virtual machine by:
    retrieving the backup base disk image and all backup secondary copy-on-write images;
    creating an initially empty new primary copy-on-write image of the backup base disk image;
    committing data from all the backup secondary copy-on-write images into the new primary copy-on-write image;
    creating an initially empty new secondary copy-on-write image of the new primary copy-on-write image;
    booting a new virtual machine from the new secondary copy-on-write image; and
    storing writes by the new virtual machine writes in the new secondary copy-on-write image.

8. A apparatus to create virtual machines, comprising:
- a copy-on-write image creator module to create an initially empty primary copy-on-write image of a base disk image and an initially empty secondary copy-on-write image of the primary copy-on-write image, the base disk image being a template for the virtual machines;
- a modification and storage module to store writes by a virtual machine in the secondary copy-on-write image, the virtual machine being booted from the secondary copy-on-write image; and
- a copy-on-write image processor module to, when the secondary copy-on-write image reaches a capacity threshold, commit data from the secondary copy-on-write image into the primary copy-on-write image and then clearing the secondary copy-on-write image;
- a processor to execute the copy-on-write image creator module, the modification and storage module and the copy-on-write image processor module.

9. The apparatus of claim 8, further comprising a copy-on-write image backup module to back up the data of the secondary copy-on-write image prior to clearing the secondary copy-on-write image.

10. The apparatus of claim 9, further comprising a base disk image backup module to, when data of the secondary copy-on-write image is backed up for the very first time, back up the base disk image.

11. The apparatus of claim 10, further comprising a virtual machine recovery module to:
- retrieve the backup base disk image and all backup secondary copy-on-write images;
- create an initially empty new primary copy-on-write image of the backup base disk image;
- commit data from all the backup secondary copy-on-write images into the new primary copy-on-write image;
- create an initially empty new secondary copy-on-write image of the new primary copy-on-write image;
- boot a new virtual machine from the new secondary copy-on-write image; and
- store writes by the new virtual machine writes in the new secondary copy-on-write image.

12. The apparatus of claim 8, wherein the copy-on-write image processor module is further to, when the virtual machine is to be backed up, back up the data of the secondary copy-on-write image, commit the data from the secondary copy-on-write image into the primary copy-on-write image, and clear the secondary copy-on-write image.

13. The apparatus of claim 12, further comprising a base disk image backup module to, when the data of the secondary copy-on-write image is backed up for the very first time, back up the base disk image.

14. The apparatus of claim 13, further comprising a virtual machine recovery module to:
- retrieve the backup base disk image and all backup secondary copy-on-write images;
- create an initially empty new primary copy-on-write image of the backup base disk image;
- commit data from all the backup secondary copy-on-write images into the new primary copy-on-write image;
- create an initially empty new secondary copy-on-write image of the new primary copy-on-write image;
- boot a new virtual machine from the new secondary copy-on-write image; and
- store writes by the new virtual machine writes in the new secondary copy-on-write image.

15. A non-transitory, machine readable medium comprising instructions to be executed by a processor to:
- create an initially empty primary copy-on-write image of a base disk image, the base disk image being a template for virtual machines;
- create an initially empty secondary copy-on-write image of the primary copy-on-write image;
- boot a virtual machine from the secondary copy-on-write image;
- store writes by the virtual machine writes in the secondary copy-on-write image; and
- when the secondary copy-on-write image reaches a capacity threshold, commit data from the secondary copy-on-write image into the primary copy-on-write image and clearing the secondary copy-on-write image.

* * * * *